Nov. 3, 1964 C. Q. MINER 3,155,418
MOBILE COACH-TYPE LIVING QUARTERS FOR LAND VEHICLES
Filed July 5, 1961 3 Sheets-Sheet 3

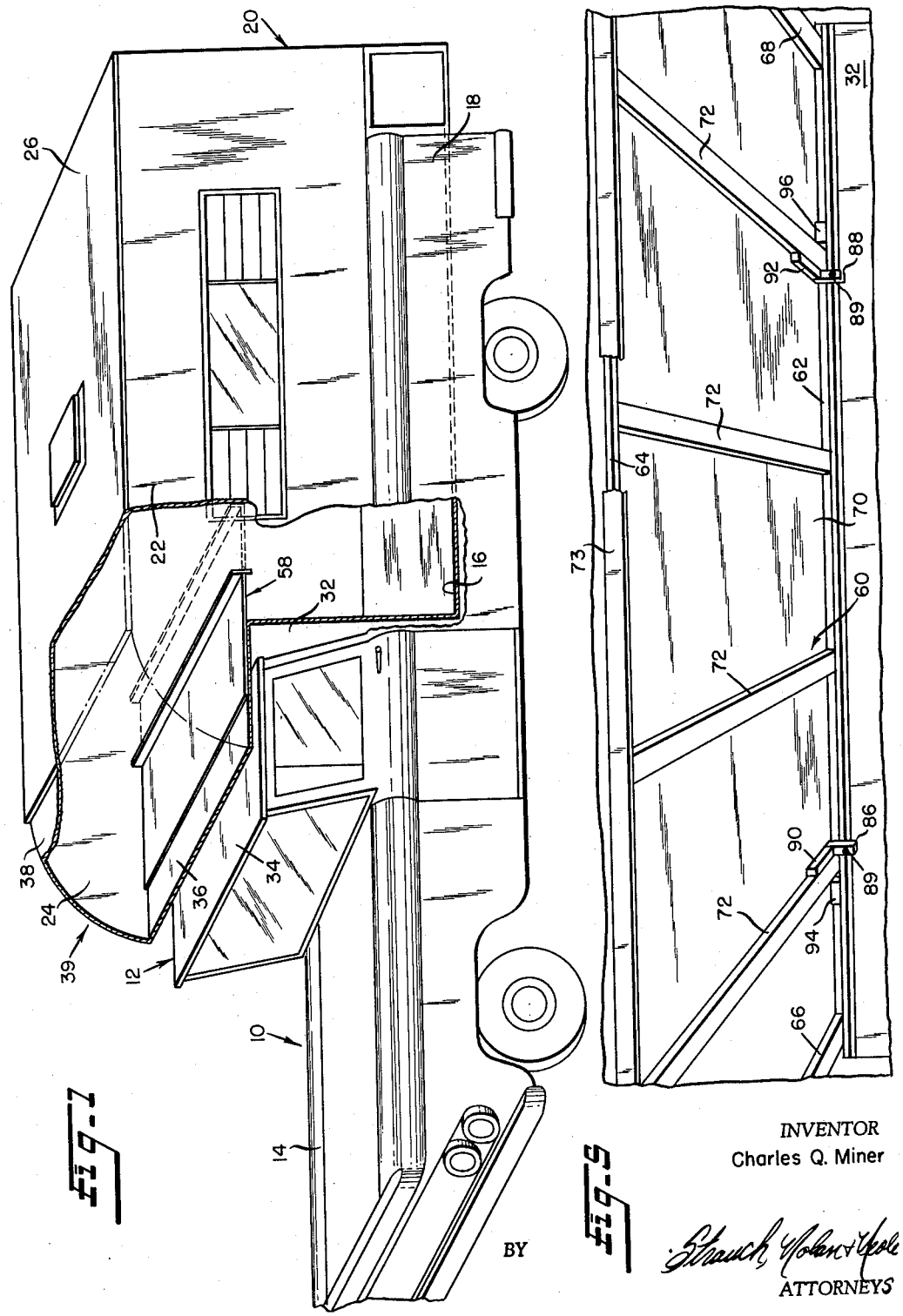

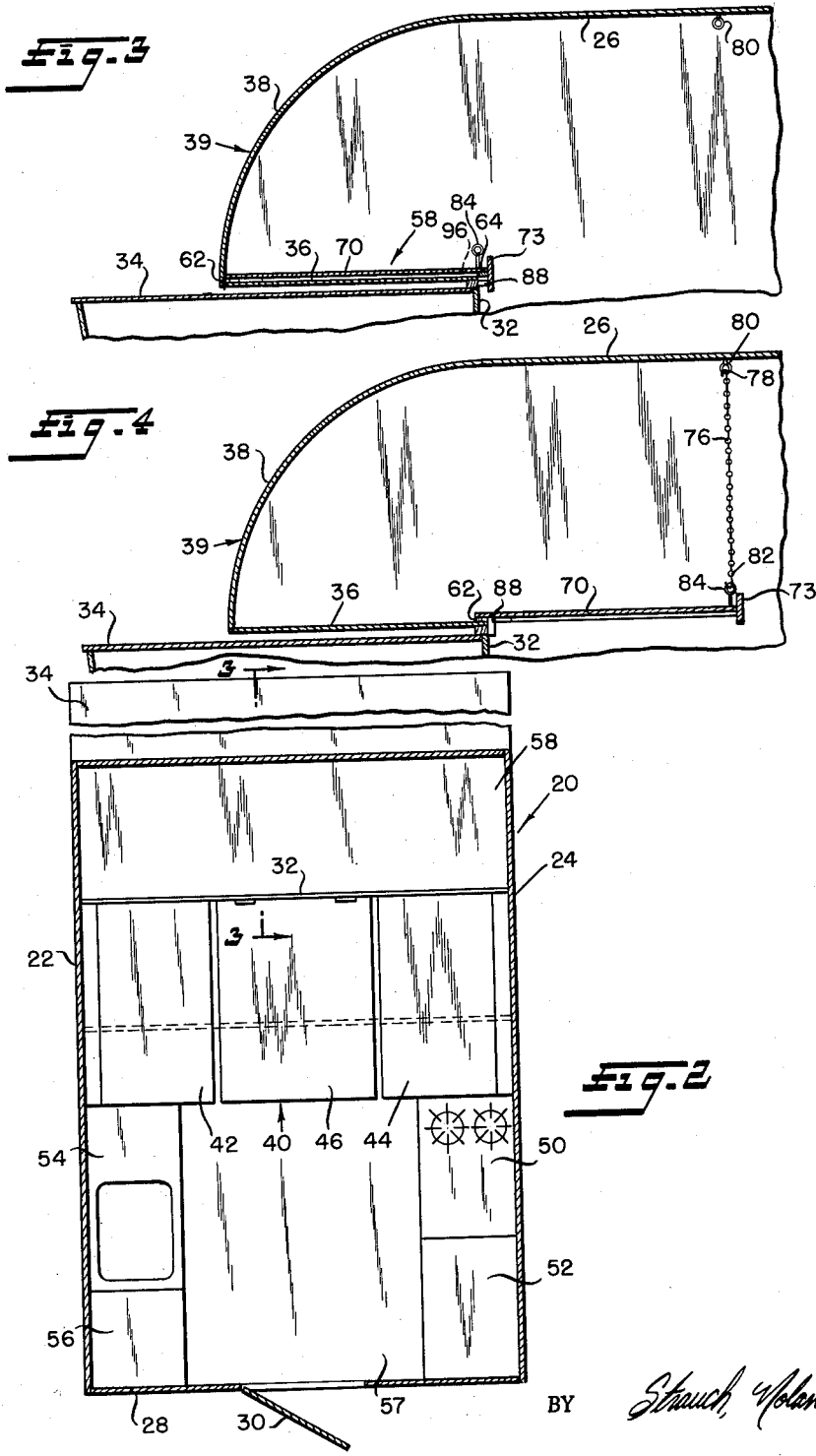

INVENTOR
Charles Q. Miner

BY
ATTORNEYS

United States Patent Office 3,155,418
Patented Nov. 3, 1964

3,155,418
MOBILE COACH-TYPE LIVING QUARTERS FOR LAND VEHICLES
Charles Q. Miner, Rte. 4, Box 233, Boise, Idaho
Filed July 5, 1961, Ser. No. 122,016
3 Claims. (Cl. 296—23)

The present invention relates to mobile living quarters for land vehicles and more particularly to an enclosed house-type coach mounted on a pick-up truck and equipped to provide living quarters.

In coaches of the type referred to, it is common practice to furnish the coach with various facilities such as kitchen utilities and a dinette which is convertible into sleeping quarters. The coach is mounted on the open loading deck of a conventional pick-up truck so as to provide for mobile living quarters which correspond to camping trailers but which do not have the disadvantages attributable to hauling and handling such trailers.

Since only a limited space is available in a truck-mounted coach for the different facilities necessary for preparing food, dining and sleeping, the accommodations for sleeping space are very restricted and usually are limited to two persons. In order to increase the sleeping capacity of the coach and thereby accommodate families having at least four members, a more recent development has been proposed which involves a body construction having a front nose extension. The nose extension extends forwardly and overhangs the cab of the truck and has a double bed so as to provide additional sleeping space for two more persons. The double bed is advantageously positioned crosswise in the nose extension to make maximum use of the available space in the coach. This construction requires that the nose be made with sufficient depth to receive the double bed. Consequently, the length of nose extension extending forwardly over the cab is about 48 to 52 inches so that the front face of the nose extension is flush with the front of the cab or in the case of a 52 inch nose, 5 or 6 inches beyond the windshield of the truck cab. As a result, the nose extension contributes to an appreciable increase in the wind resistance to make maneuverability and control of the truck more difficult, in addition to causing an increase in consumption of fuel.

The present invention contemplates a special double bed arrangement for a nose extension of a truck-mounted coach-type body whereby the length of the nose extension overhanging the cab is materially decreased to facilitate a corresponding reduction in the wind resistance attributable to the coach body.

This is accomplished in accordance with the present invention essentially by providing for a sliding bed deck which is arranged to slide out of the nose extension and into the interior of the coach to form a double bed with a bed platform disposed within the nose extension. By this novel bed construction a double bed is provided for, while at the same time, the length of the nose extension is reduced to approximately one-half the length of those prior art nose extensions which accommodate double beds.

Accordingly, it is the primary object of the present invention to provide for an improved truck-mounted house-type coach which utilizes the interior living space more efficiently to thereby reduce the size of the body without diminishing the sleeping capacity of the coach.

A further object of the present invention is to provide for an improved truck-mounted coach body equipped to provide for living quarters and having a front nose extension overhanging the truck cab which accommodates a special bed arrangement for two persons but which is only slightly longer than the width of a single bed.

Still another object of the present invention is to reduce the length of a front nose extension of a truck-mounted coach body which overhangs the cab of the truck to reduce the wind resistance produced by the body.

Still another and more specific object of the present invention is to provide for a novel and improved bed construction which is disposed in the front nose extension of a truck-mounted coach body and which has an extensible single bed section slidably mounted over a stationary platform and arranged to be slid out of the nose extension to form a double bed with the platform in the nose extension.

Further objectives of the invention will appear as the description proceeds in connection with the appended claims and the annexed drawings wherein:

FIGURE 1 is a perspective view of a coach body mounted on a conventional pick-up truck and incorporating a preferred embodiment of the present invention with a portion of the wall surfaces of the coach broken away to show interior details;

FIGURE 2 is a sectional plan view of the coach shown in FIGURE 1;

FIGURE 3 is a section taken along lines 3—3 of FIGURE 2;

FIGURE 4 is a section similar to FIGURE 3 but with the slidable bed section shown in its extended position;

FIGURE 5 is a perspective view looking upwardly at the bottom surface of the slidable bed section in its extended position to show details of the frame and of the locking arrangement;

Figure 6:
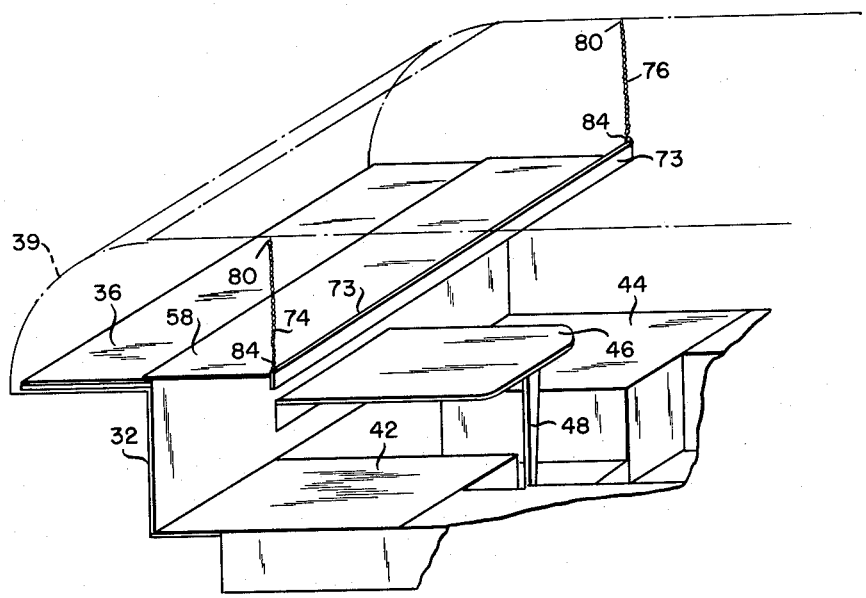
FIGURE 6 is a perspective view of the interior of the coach showing the slidable bed section in its extended position and showing the coach body in phantom lines.

Referring now to the drawings and more particularly to FIGURE 1 showing the construction according to a preferred embodiment of the present invention, the reference numeral 10 generally designates a conventional pick-up type truck having a standard enclosed cab 12 located between a front engine 14 and an open loading platform 16 extending rearwardly of cab 12. Conventional pick-up trucks, as well as other automotive vehicles, are constructed with the streamlined bodies having a front windshield which slopes rearwardly and which is curved at the sides to minimize wind resistance. Such trucks are commonplace, as particularly evidenced by recent Ford and Chevrolet models. Truck 10 is provided with the usual parallel side panels, indicated at 18 (one shown), which extend along opposite sides of platform 16 and rearwardly of cab 12.

With reference to FIGURES 1 and 2, an enclosed house-type coach 20 is mounted on platform 16 in the conventional manner and comprises parallel windowed side walls 22 and 24 extending upwardly from panels 18 and a flat roof 26 extending between the top edges of side walls 22 and 24. The back end of coach 20 is closed by a rear wall 28 in which a door 30 (FIGURE 2) is provided for to permit access into the interior of the coach.

At the forward end of coach 20, there is an upright front wall 32 which extends between side walls 22 and 24 and which is substantially flush with the rear face of cab 12. The top edge of front wall 32 is slightly above the roof 34 of cab 12. Extending forwardly from the top edge of front wall 32 is a horizontal platform 36 which is spaced above cab roof 34 and which terminates approximately midway between the front and rear faces of cab 12. A front nose section 38 is convexly curved to extend forwardly from the front edge of roof 26 and downwardly to the front edge of platform 36 as best shown in FIGURES 1, 3 and 4. The portions of side walls 22 and 24 which extend forwardly of front wall 32 together with front section 38 and platform 36 form a nose extension 39 for a purpose as will presently appear.

The wall construction of coach 20 is conventional and may have aluminum sheeting on the exterior with plywood paneling on the interior.

As best shown in FIGURES 2 and 6, coach 20 has a width which is sufficient to afford sleeping accommodations and for this purpose, a conventional convertible dinette set 40 is provided for adjacent to front wall 32. As shown, the dinette set 40 comprises a pair of opposed cushioned seats 42 and 44 which extend rearwardly from front wall 32 and along side walls 22 and 24 respectively. Between seats 42 and 44 is a dinette table 46 which is suitably hinged at its forward end to front wall 32 and which has a foldable support leg 48 (FIGURE 6) at its rearward end. This dinette construction is conventional and is convertible into a double bed by folding leg 48 up under table 46 to allow table 46 to be swung down against front wall 32 and by extending seats 42 and 44 toward each other in the usual manner. Thus, a double bed to accommodate two persons is formed and extends between side walls 22 and 24 rearwardly of front wall 32.

With continued reference to FIGURE 2, a stove 50 and a cabinet 52 are located along side wall 24 between rear wall 28 and seat 44. On the opposite side of coach 20 a sink 54 and refrigerator 56 are located along side wall 22 between seat 42 and rear wall 28.

With this interior equipment, a walking and working space 57 is formed and has an overall height sufficient to provide adequate head room for a person when standing. The foregoing equipment in coach 20 is generally conventional and may be arranged as desired.

In the past, the standard nose extension on conventional coach bodies has been constructed with stationary horizontal bed decks to form a double bed extending transversely between side walls 22 and 24 for sleeping two persons. By making the interior depth of the nose extension sufficiently long to receive a double bed of normal width, the external length of the nose extension is 48–52 inches and extends at least the entire length of the truck cab. With this prior art construction, it will be appreciated that the nose extension offers considerable wind resistance, thus making control and maneuverability of the truck more difficult in addition to increasing the fuel consumption of the vehicle.

With the present invention, a special nose extension and double bed arrangement is provided for to reduce the external length of the nose extension to approximately half and yet to furnish sleeping space for two more persons.

As best shown in FIGURES 1 and 3–6, the special double bed arrangement comprises a horizontal pull-out bed deck 58 which is slidably supported on platform 36 and which has a suitable rigid rectangular underframe 60 (FIGURE 5). Frame 60 is formed by parallel spaced apart elongated side members 62 and 64 and parallel spaced apart end members 66 and 68 extending perpendicularly between side members 62 and 64. A flat sided panel 70 is mounted on the top side of frame 60 and is fixed thereto by any suitable means such as screws (not shown). Panel 70 may be of any suitable material, such as plywood to support the weight of the person. To brace panel 70 in its fixed position on frame 60 a set of cross members 72 are mounted between end members 66 and 68 and extend perpendicularly between side members 62 and 64 in parallel spaced apart relationship to each other and to end members 66 and 68 to prevent panel 70 from sagging or bowing intermediate end members 66 and 68.

Frame 60 together with cross members 72 may be made up from any suitable material such as lumber having a rectangular cross section and smooth side faces. The bottom face of frame 60 is smooth and is contained in a single horizontal plane to allow bed deck 58 to be easily slid over the flat top surface of platform 36.

Figure 7:
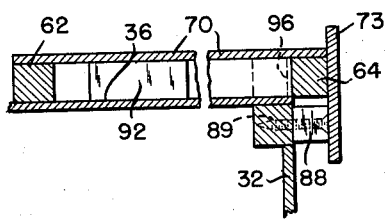
FIGURE 7 is an enlarged fragmentary view of FIGURE 3 illustrating the mounting of the bed deck on the nose extension platform.

As shown in FIGURES 2, 3 and 7, bed deck 58 is in an unextended position. The length and width of bed deck 58 are slightly smaller than that of platform 36 and correspond to the width and length of a single bed, namely, 24 inches by 76 inches. In the preferred embodiment, the width and length of bed deck 58 is approximately 25 inches and 73 inches respectively such that when it is in its unextended position, the rear edge of panel 70 is nearly flush with the interior surface of front wall 32. In this position, bed deck 58 extends the entire length of nose extension 39 with frame 60 resting on platform 36 and may be used as a single bed. A finished panel strip 73 is fixed to frame 60 along its rearwardly facing edge. Strip 73 is perpendicular to frame 60 and extends downwardly below the top edge of front wall 32 as best shown in FIGURE 3.

Figure 8:
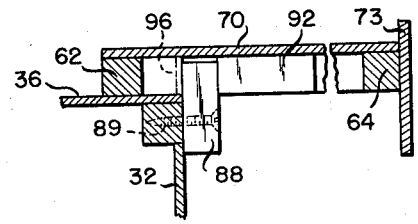
FIGURE 8 is an enlarged fragmentary view of FIGURE 4 illustrating the locking arrangement for the slidable bed section in its extended position.

When bed deck 58 is slid out to its extended position as shown in FIGURES 4 and 8, frame member 62 rests on the rearward marginal edge of platform 36 adjacent to front wall 32 thereby providing a support for the forwardly facing side edge of bed deck 58. The rearwardly extending side of bed deck 58 extending beyond platform 36 is suspended from roof 26 by means of a pair of vertically arranged chains 74 and 76 (FIGURE 6) which have hooks indicated at 78 fastened to eye-screws 80 threadedly secured to roof 26 and extending downwardly therefrom. The lower ends of chains 74 and 76 are provided with hooks indicated at 82 which are adapted to be secured to eye-screws 84 threadedly secured in the rearward corners of frame 60 and extending above panel 70.

In order to prevent bed deck 58 from sliding forwardly into nose 39 from the extended position shown in FIGURE 4, a locking arrangement is provided for and comprises, as best seen from FIGURE 5, a pair of spaced apart small block-like stop abutments 86 and 88 pivotally mounted on front wall 32 for swinging movement in a plane parallel to and rearwardly of front wall 32. Abutments 86 and 88 are mounted near the upper edge of front wall 32 such that they are below the top surface of platform 36 when pivoted to a substantially horizontal position (FIGURE 7). When pivoted to a vertical position (FIGURES 5 and 8) the upper portions of abutments 86 and 88 project above the top surface of platform 36. Abutments 86 and 88 are secured to front wall 32 as by screws 89 such that they are frictionally held in place when pivoted to either a horizontal or vertical position.

With bed deck 58 in its extended position and abutments 86 and 88 in vertical positions, the upper portions of abutments 86 and 88 extend upwardly between end members 66 and 68 closely adjacent to the side faces of two of the cross pieces 72. In this vertical position, the upper portions of abutments 86 and 88 align with a pair of blocks 90 and 92 which are fixed to the side edges of cross pieces 72 in a manner best shown in FIGURE 5. Blocks 90 and 92 are formed with smooth bottom surfaces contained in the same plane as the bottom face of frame 60 and with flat forwardly extending end faces which are spaced apart from side member 62 by a distance greater than the thickness of abutments 86 and 88.

With bed deck 58 in its unextended position as shown in FIGURES 3 and 7, abutments 86 and 88 are in horizontal positions immediately below frame 60. When bed deck 58 is pulled out to its extended position, abutments 86 and 88 are swung about pivots 89 to their vertical positions shown in FIGURES 5 and 8 and project upwardly between blocks 90 and 92 and side member 62. Thus, sliding movement of bed deck 58 toward the front of nose extension 39 is prevented by abutting engagement of blocks 90 and 92 with abutments 86 and 88 respectively.

In order to prevent bed deck 58 from being pulled out beyond platform 36, a pair of block-shaped abutments 94 and 96 are fixed to the rearward marginal edge of platform 36. Abutments 94 and 96 are of slightly less thickness than frame 60 and project upwardly between the outermost cross pieces 72 and end members 62 and 68 as best shown in FIGURE 5. As bed deck 58 is pulled out, the inside face of side member 62 is shifted into engagement with abutments 94 and 96 to thereby prevent further outward displacement of bed deck 58.

Thus, by sliding bed deck 58 out to its extended position shown in FIGURES 4, 6 and 8 where it overhangs front wall 32 above the dinette set 40, a double bed is formed to furnish sleeping space for two additional persons. In extended position, bed deck 58 is securely supported by chains 74 and 76 at its rearward side and by platform 36 at its forward side. Mattresses or cushions (not shown) may be arranged on platform 36 and bed deck 58 to make up a comfortable double bed.

In order to return the bed deck to its unextended position shown in FIGURE 3, the bedding on platform 36 is lifted, abutments 86 and 88 are pivoted to horizontal positions and chains 74 and 76 are unhooked from eyescrews 84. Bed deck 58 then is free to be easily pushed forwardly into nose extension 39 with a sliding movement over platform 36.

Thus, with this pull-out bed arrangement, nose extension 39 provides for sleeping space for two additional persons but only has a length corresponding approximately to the width of a single bed. As a consequence, nose extension 39 is set back from the front of cab 12 and extends only approximately midway between the front and rear edges of roof 34.

By setting the front edge of nose extension 39 back to a position approximately midway between the front and rear edges of cab roof 34, the windshield of cab 12 diverts air flow upwardly and along an inclined path such that the main body of air flow over the cab 12 is partially diverted to an elevated position above the cab roof 34 when it reaches nose extension 39. Thus, the wind resistance attributable to nose extension 39 is considerably reduced.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a pick-up type truck having an open rear loading frame and a cab provided with a forwardly facing windshield and located adjacent to and forwardly of said loading frame, an enclosed house-type coach comprising a body mounted on said loading frame and providing a living compartment vertically over said loading frame and a nose extension projecting forwardly over the top of said cab and terminating approximately midway between the front and back of said cab with the space in said nose extension vertically above said cab being sufficient to provide sleeping space only for one person lying transversely of said cab, said nose extension extending substantially over the entire width of said cab and having a convex top wall portion facing upwardly and forwardly with said windshield being operable during forward movement of said truck to divert air flow upwardly and along an inclined path such that the main body of air flow is partially diverted to an elevated position above the top of said cab when it reaches the vicinity of said nose extension, a bunk of single bed width mounted in said nose extension vertically above said cab, and an extensible bunk section arranged with said bunk to be displaced rearwardly with respect to said nose extension and into said compartment and vertically above said loading frame in juxtaposed relationship with said bunk to form a double bed therewith.

2. A coach-type body equipped for habitation and adapted to be mounted on an open loading deck of a truck having a cab located immediately in front of and at least partially above said loading deck, said coach-type body comprising means including front, rear, side and top walls forming a living compartment above said loading deck and rearwardly of said cab, means forming a nose extension opening into said living compartment, said nose extension projecting forwardly thereover only to a region approximately midway between the front and back of said cab to provide sleeping space for a single person lying transversely of said cab, a horizontal platform in the bottom of said nose extension dimensioned to provide for a single bed, a horizontal bed deck having approximately the same dimensions as said platform and being slidably supported thereon for displacement from a position overlying said platform to an extended position where said bed deck is supported on said platform only along its forward marginal edge extending transversely of said nose extension, means for supportingly suspending the rearward side of said bed deck when in said extended position and means for locking said bed deck against horizontal movement into and out of said nose extension when in said extended position.

3. The coach-type body as defined in claim 2 wherein said means for locking said bed deck comprises a first stop abutment pivotally mounted on said front wall and swingable to a position when said bed deck is in extended position to prevent sliding displacement into said nose extension, and a second stop abutment rigid with said front wall for preventing displacement of said bed deck beyond said extended position.

References Cited in the file of this patent

UNITED STATES PATENTS 2,267,509    Strong _____ Dec. 23, 1941

FOREIGN PATENTS 822,656    Germany _____ Nov. 26, 1951

OTHER REFERENCES

Article: "Drag of Cars Charted in Wind Tunnel Tests," in "Automotive Industries" of April 2, 1932, vol. 66, No. 14, pages 520–522.

Article: "New Type of Safety Truck," in "The Sunday Star," Washington, D.C., March 4, 1923.

Article: "The Sterling & Welch Co," in "Autobody," February 1926, page 56.

"Dreamer Coach," publication of 1957.